United States Patent
Gill

(10) Patent No.: US 9,366,031 B2
(45) Date of Patent: Jun. 14, 2016

(54) ECCENTRICALLY LOADED STRUCTURAL MEMBERS AND METHODS OF FORMING THE SAME

(71) Applicant: AVTECHTYEE INC., Everett, WA (US)

(72) Inventor: Justin Edward Gill, Everett, WA (US)

(73) Assignee: AVTECHTYEE INC., Everett, WA (US)

( * ) Notice: Subject to any disclaimer, the term of this patent is extended or adjusted under 35 U.S.C. 154(b) by 0 days.

(21) Appl. No.: 14/887,715

(22) Filed: Oct. 20, 2015

(65) Prior Publication Data

US 2016/0040429 A1 Feb. 11, 2016

Related U.S. Application Data

(62) Division of application No. 14/250,309, filed on Apr. 10, 2014, now Pat. No. 9,194,126.

(60) Provisional application No. 61/810,653, filed on Apr. 10, 2013.

(51) Int. Cl.
*E04C 3/30* (2006.01)

(52) U.S. Cl.
CPC .......................................... *E04C 3/30* (2013.01)

(58) Field of Classification Search
CPC ........... E04C 3/30; F16M 11/24; F16M 11/28
See application file for complete search history.

(56) References Cited

U.S. PATENT DOCUMENTS

| | | | |
|---|---|---|---|
| 1,900,763 A | 3/1933 | Rowe | |
| 2,388,309 A | 11/1945 | Curtiss | |
| 3,754,609 A | 8/1973 | Garrett | |
| 3,934,450 A * | 1/1976 | Reed | B21D 7/06 72/309 |
| 4,059,816 A * | 11/1977 | Bonecutter | H01H 9/102 218/147 |
| 4,763,878 A | 8/1988 | Abraham et al. | |
| 5,175,972 A * | 1/1993 | Sridhara | E04C 3/10 52/834 |
| 5,862,003 A * | 1/1999 | Saif | B81B 3/0037 359/224.1 |
| 6,257,190 B1 | 7/2001 | Linebarger | |
| 6,357,190 B1 * | 3/2002 | Florentine | E04G 23/0218 248/351 |
| 6,957,515 B1 * | 10/2005 | Hatfield | E04F 21/18 248/354.3 |
| 8,136,317 B1 | 3/2012 | McCown | |
| 2006/0073712 A1 * | 4/2006 | Suhir | B82Y 10/00 439/74 |
| 2006/0260217 A1 | 11/2006 | Black et al. | |
| 2006/0260219 A1 * | 11/2006 | Riddle | E04G 21/1891 52/127.2 |
| 2010/0205876 A1 * | 8/2010 | Christopoulus | E04H 9/02 52/167.3 |
| 2011/0249353 A1 | 10/2011 | White | |
| 2013/0292349 A1 | 11/2013 | Bucklew et al. | |
| 2014/0000999 A1 | 1/2014 | Boulet et al. | |
| 2014/0360106 A1 | 12/2014 | Sawyers | |

FOREIGN PATENT DOCUMENTS

JP 09317085 A * 12/1997
SU 1 350 538 A1 11/1987

* cited by examiner

*Primary Examiner* — Jeanette E Chapman
(74) *Attorney, Agent, or Firm* — Lewis Roca Rothgerber Christie LLP

(57) ABSTRACT

Eccentrically loaded structural members and methods of forming the same. The structural members have their compressive loading axes offset from their load central longitudinal axes.

3 Claims, 12 Drawing Sheets

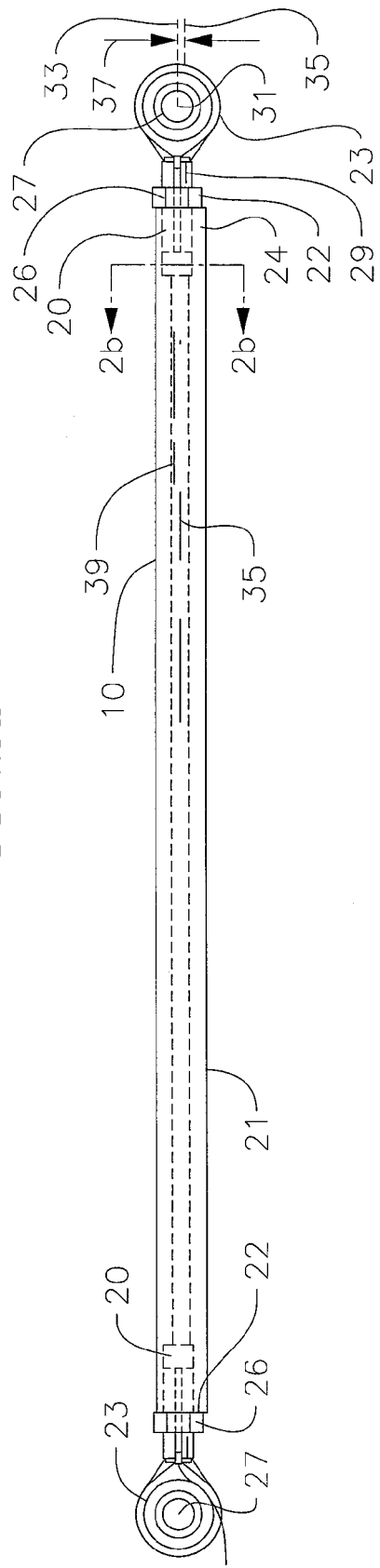

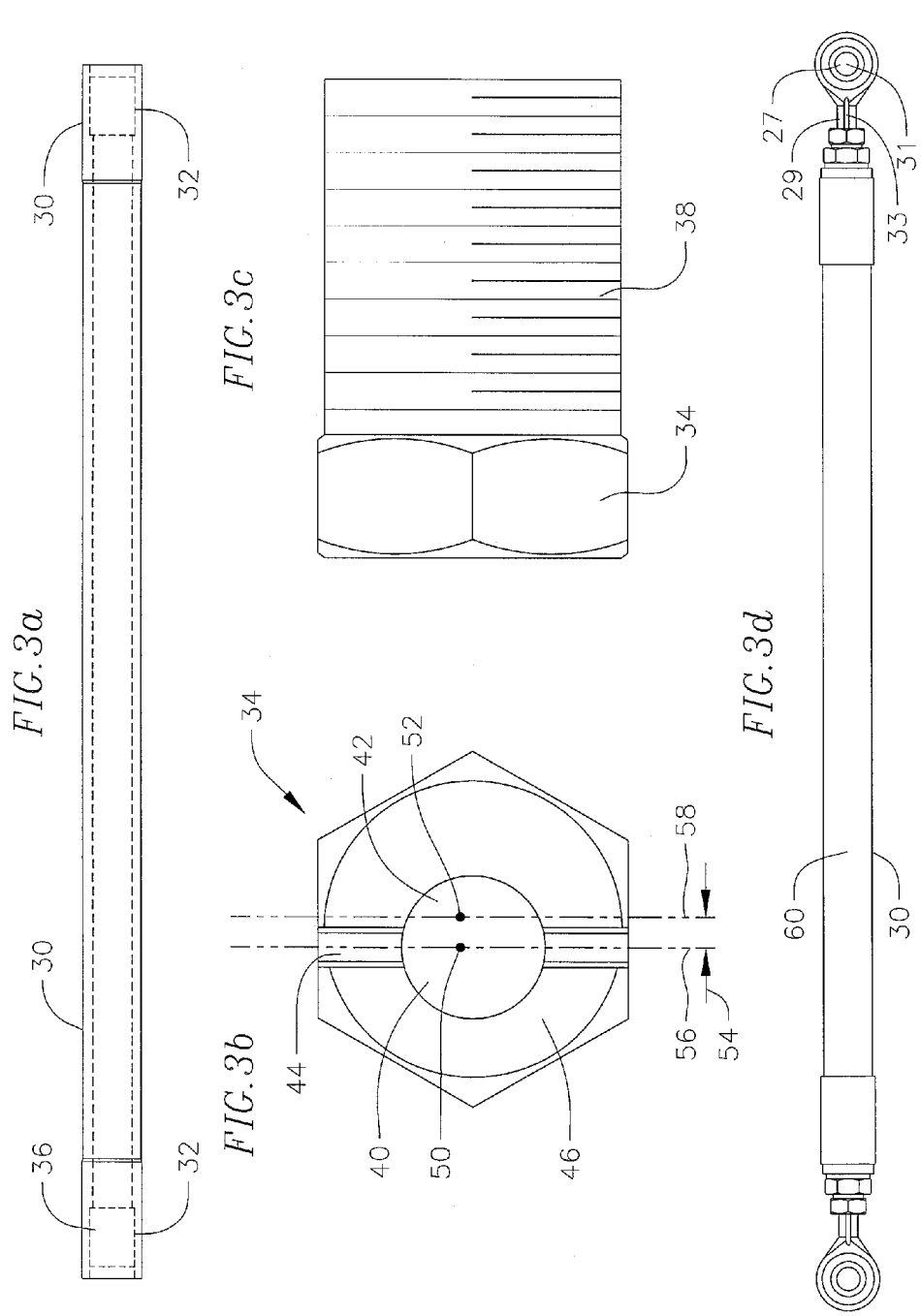

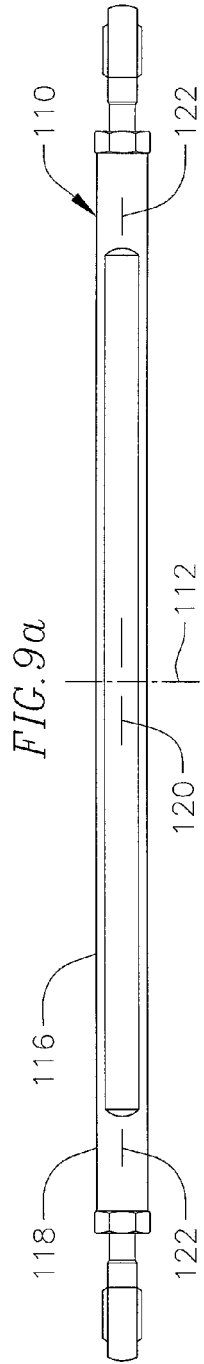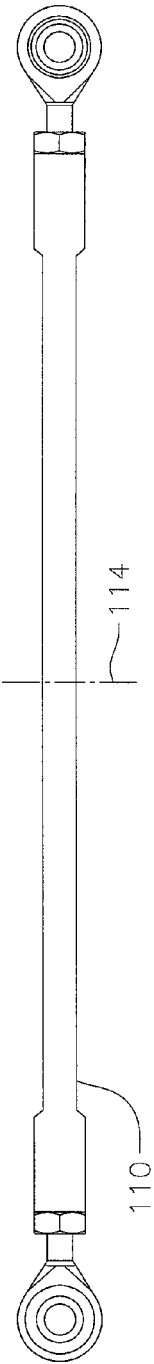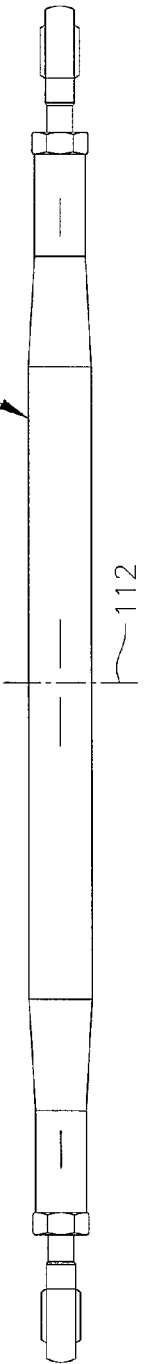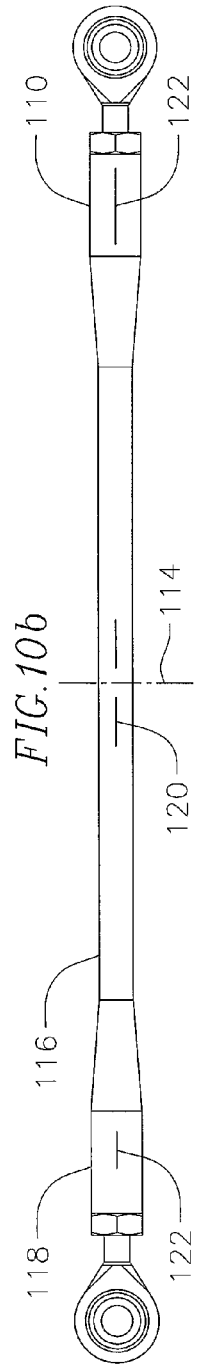

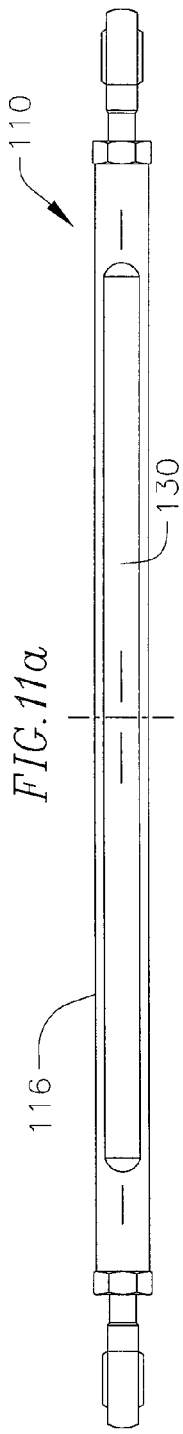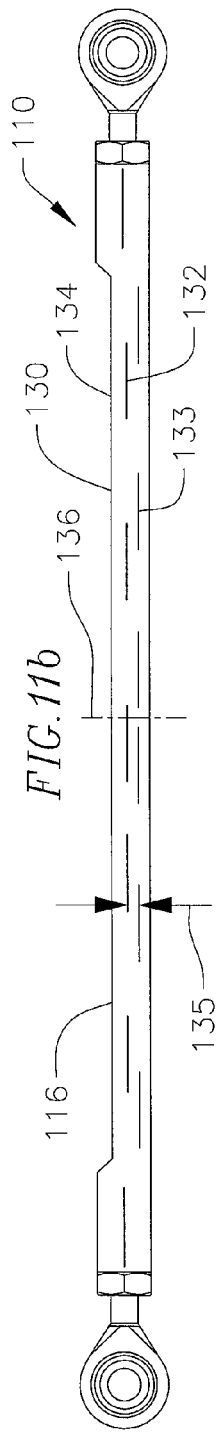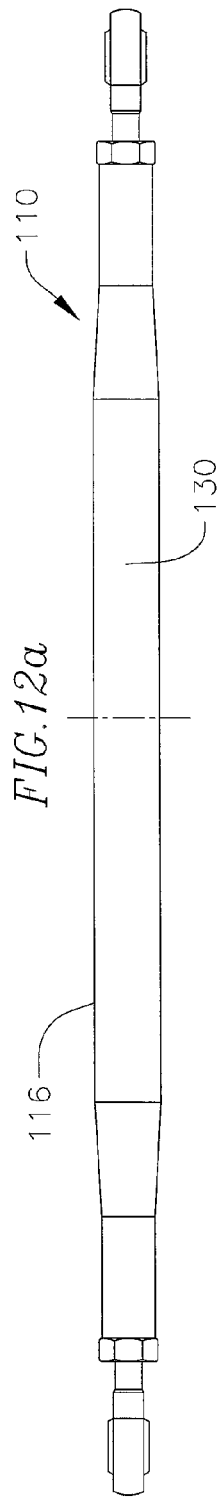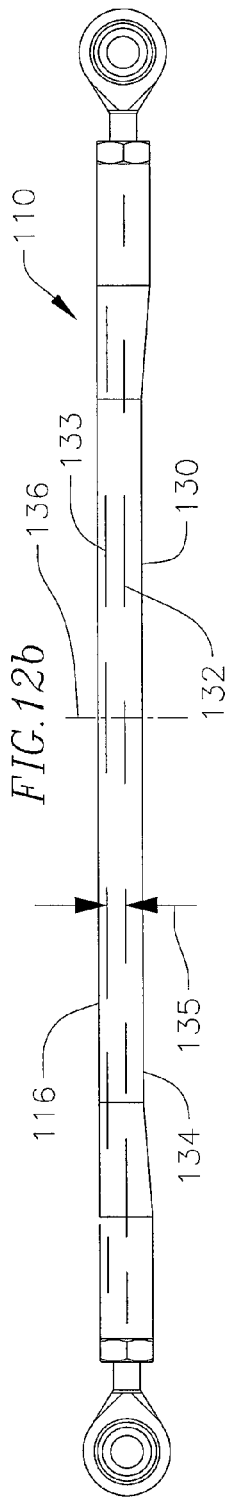

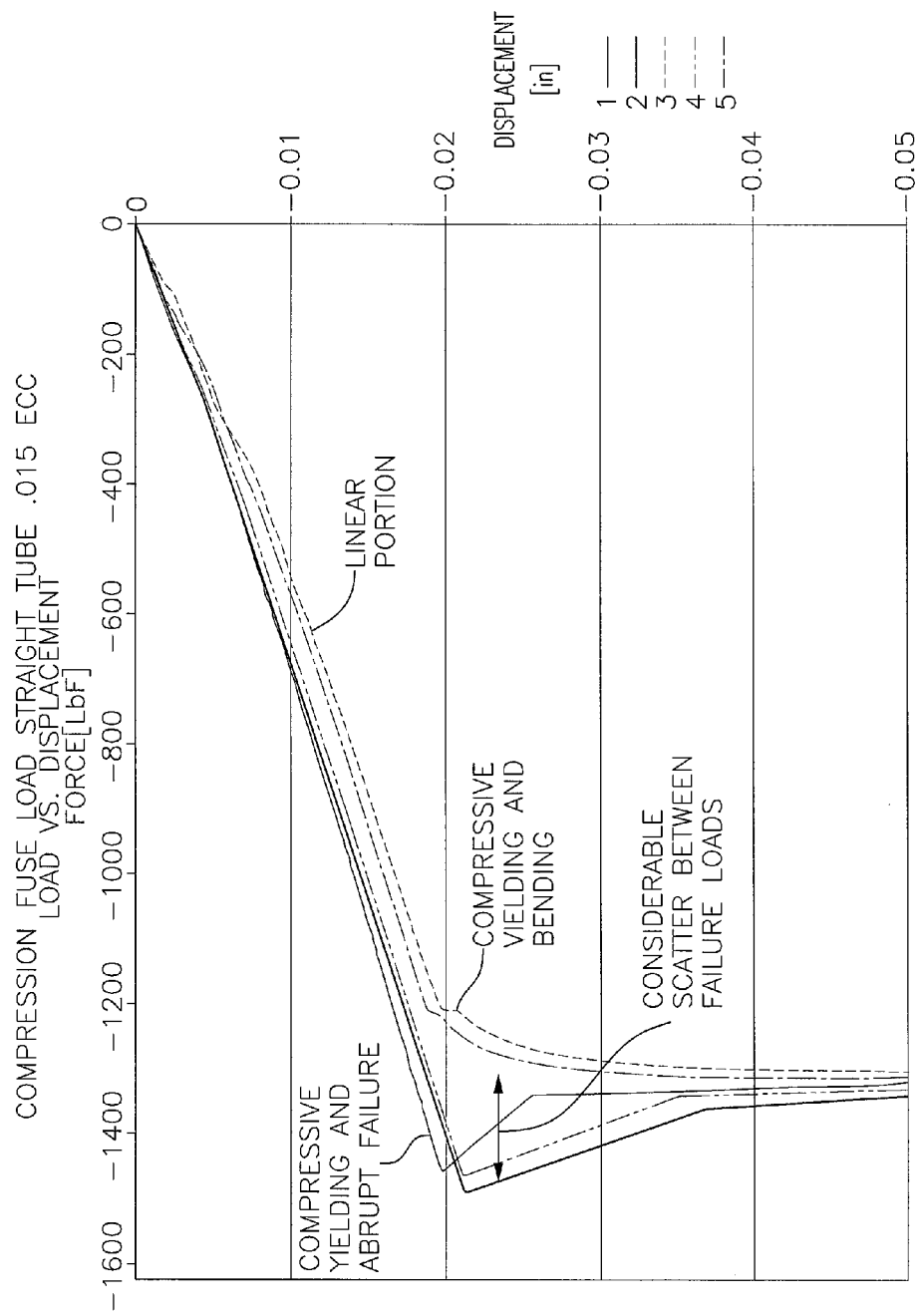
FIG. 13 TESTING RESULTS FOR .015" ECCENTRICITY SPECIMENS (1-5)

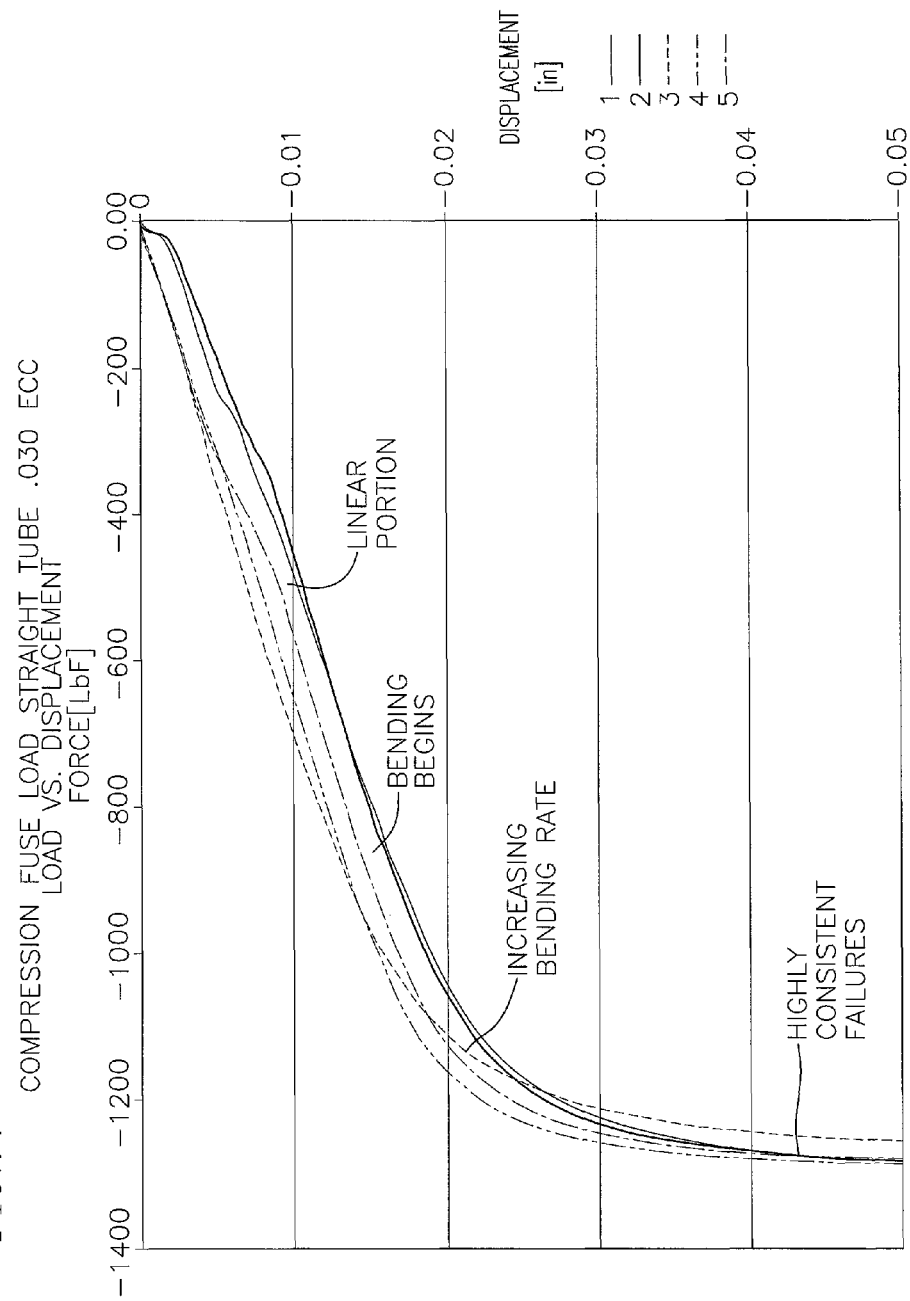
FIG. 14 TESTING RESULTS FOR .030" ECCENTRICITY SPECIMENS (1-5)
COMPRESSION FUSE LOAD STRAIGHT TUBE .030 ECC
LOAD VS. DISPLACEMENT

ECCENTRICALLY LOADED STRUCTURAL MEMBERS AND METHODS OF FORMING THE SAME

CROSS-REFERENCE TO RELATED APPLICATION

This is a divisional application of U.S. application Ser. No. 14/250,309, filed Apr. 10, 2014, entitled "ECCENTRICALLY LOADED STRUCTURAL MEMBERS AND METHODS OF FORMING THE SAME", which claims the priority to and the benefit of U.S. Provisional Application Ser. No. 61/810,653, filed Apr. 10, 2013, entitled "ECCENTRICALLY LOADED STRUCTURAL MEMBERS AND PROCESSES", the entire contents of which are incorporated by reference.

BACKGROUND

Fuse structural members are elongated members which must fail at predetermined loads to avoid damage to surrounding mechanical elements, while still maintaining sufficient strength and rigidity to efficiently and safely transmit forces at sub-fuse loads. In compression, the successful design of a fuse load is complicated by the variable degree in bending of the member as the load increases. The failure point and direction of failure is driven by the presence of manufacturing eccentricities and tolerances, material variations and cross sectional shape throughout the length of the member.

Fuse loads are the predetermined loads that cause fuse structural members to fail prior to damaging surrounding elements. Fuse loads in compression are usually accomplished by the use of either a shear pin or spring mechanism. In the case of the shear pin the load that causes the pin to shear in compression will also shear at the same load in tension. In the case of a spring, the assembly does not fail but begins to displace according to Hooks Law once the spring preload is surpassed. Therefore, the spring continues to add force as displacement increases. Both shear pin and spring mechanism fuse loads are expensive to manufacture, add complexity to designs and have limitations to their applications. In weight or fatigue critical applications, such as aerospace, the use of a spring mechanism may be impractical.

Typical rod assembly design for compression relies heavily on Euler and Johnson-Euler equations to determine safe working loads. These equations establish the theoretical lowest compressive loads where columns, as for example structural rod assemblies and struts, can be expected to buckle. A theoretical column with no load eccentricity, subject to an increasing compressive force, would eventually fail due to compressive yielding. This compressive yielding creates a local instability that will eventually lead to bending and subsequent buckling. Initial yielding failure would occur at an unpredictable location and cause instability in an unpredictable direction.

Structural members that experience significant bending during compressive loads may gain structural support if they rest against neighboring elements. According to Euler compressive column theory, a column 10 that gains support 12 (FIG. 1b) at mid span will have a buckling load 8 times higher than column 10 supported by pins 14 (FIG. 1c). A column 10 that gains transverse support at its ends 16 by support members 18 (FIG. 1a) will have a buckling load 4 times higher than a column supported only by pins (FIG. 1c). Even slight support gained from surrounding elements can have large impacts on the magnitude of the expected compressive failure load.

Additionally, failures in pure compression without significant bending rely heavily on compressive yielding. Compressive yielding and the resulting plasticity are extremely hard to accurately predict and can be affected by many factors which are difficult to consistently control in a manufacturing environment. Euler bending failures are described as geometric failures and are not dependent upon the stress capacity of the material.

SUMMARY OF THE INVENTION

In an example embodiment, an elongated member is provided. The elongated member has an elongated body having a load central longitudinal axis. A first fitting is coupled to a first end of the elongated body for applying a compressive load to the elongated body along a first axis offset from said load central longitudinal axis. A second fitting is coupled to a second end of the elongated body opposite the first end for applying a compressive load to the elongated body along a second axis offset from the load central longitudinal axis.

$$\text{The elongated body } \frac{\frac{L_e}{r_{min}}}{\sqrt{\frac{\pi^2 E}{\sigma_y}}}$$

is greater or equal to 0.5, wherein:
L=Length of the elongated body
$L_e$=Effective Length of the elongated body
$I_{min}$=Minimum Second Moment of Inertia of the elongated body
A=Cross sectional Area of the elongated body
$r_{min}$=Minimum Radius of Gyration of $$\text{the elongated body} = \sqrt{\frac{I_{min}}{A}}$$

$\sigma_y$=Yield Stress of the elongated body
E=Modulus of Elasticity of the elongated body.

In another example embodiment, another elongated member is provided. The elongated member includes an elongated body having an outer surface defined about a central longitudinal axis. The outer surface defines a first recess section about at least a portion of the body. A first fitting is coupled to a first end of the elongated body for applying a compressive load to the elongated body along the central longitudinal axis. A second fitting coupled to a second end of the elongated body opposite the first end for applying a compressive load to the elongated body along said central longitudinal axis.

$$\text{The said elongated body } \frac{\frac{L_e}{r_{min}}}{\sqrt{\frac{\pi^2 E}{\sigma_y}}}$$

is greater or equal to 0.5,
wherein:
L=Length of the elongated body
$L_e$=Effective Length of the elongated body
$I_{min}$=Minimum Second Moment of Inertia of the elongated body A=Cross sectional Area of the elongated body
$r_{min}$=Minimum Radius of Gyration of $$\text{the elongated body} = \sqrt{\frac{I_{min}}{A}}$$

$\sigma_y$=Yield Stress of the elongated body
E=Modulus of Elasticity of the elongated body.

In yet another example embodiment, a further elongated member is provided. The elongated member includes an elongated body having an outer surface about a central longitudinal axis. The elongated body is bent defining having an arcuate shape. A first fitting is coupled to a first end of the elongated body for applying a compressive load to the elongated body. A second fitting is coupled to a second end of the elongated body opposite the first end for applying a compressive load to the elongated body.

$$\text{The elongated body } \frac{\frac{L_e}{r_{min}}}{\sqrt{\frac{\pi^2 E}{\sigma_y}}}$$

is greater or equal to 0.5,
wherein:
L=Length of the elongated body
$L_e$=Effective Length of the elongated body
$I_{min}$=Minimum Second Moment of Inertia of the elongated body
A=Cross sectional Area of the elongated body
$r_{min}$=Minimum Radius of Gyration of $$\text{the elongated body} = \sqrt{\frac{I_{min}}{A}}$$

$\sigma_y$=Yield Stress of the elongated body
E=Modulus of Elasticity of the elongated body.

In yet a further example embodiment, a method of tuning a structural member, including an eccentricity, to a fuse load is provided. The method includes subjecting the structural member to a compressive axial load by compressive axial displacement, and stopping the compressive axial displacement when the compressive axial load drops to a level of the desired fuse load. The structural member is tuned to the fuse load when the compressive axial load has plastically deformed the structural member.

In another example embodiment, a method of tuning a structural member to a fuse load is provided. The method includes subjecting the structural member to a side load sufficient to bend the structural member in a desired direction, subjecting the structural member to a compressive axial load by compressive axial displacement, stopping the compressive axial load, holding the axial displacement, and removing the side load, when the structural member has plastically deformed at mid-span or proximate mid-span. The method also includes continuing to subject the structural member to a compressive axial load by compressive axial displacement, and to stopping the compressive axial displacement when the compressive axial load drops to a level of the desired fuse load. The structural member is tuned to the fuse load when the compressive axial load has plastically deformed the structural member.

BRIEF DESCRIPTION OF THE DRAWINGS

FIG. 2a is a side view of an example embodiment structural member including end fittings.
FIG. 2b is an end view of the structural member depicted in FIG. 2a with a fitting.
FIG. 3a is a side view of another example structural member without fittings.
FIGS. 3b and 3c are an end view and a side view of an example embodiment insert for mounting on the structural member shown in FIG. 3a.
FIG. 3d is a side view of another example structural member.
FIGS. 9a and 9b are side views at 90° to each other of another example embodiment structural member.
FIGS. 10a and 10b are side views at 90° to each other of yet another example embodiment structural member.
FIGS. 11a and 11b are side views at 90° to each other of a further example embodiment structural member.
FIGS. 12a and 12b are side views at 90° to each other of yet a further example embodiment structural member.
FIGS. 13 and 14 are graphs of load vs displacement data from straight tubes with 0.015 inch and 0.030 inch eccentricity, respectively.

DETAILED DESCRIPTION

Figure 1C:
FIGS. 1a, 1b and 1c are schematic side views depicting different columns under compressive loading.
Figure 1B:
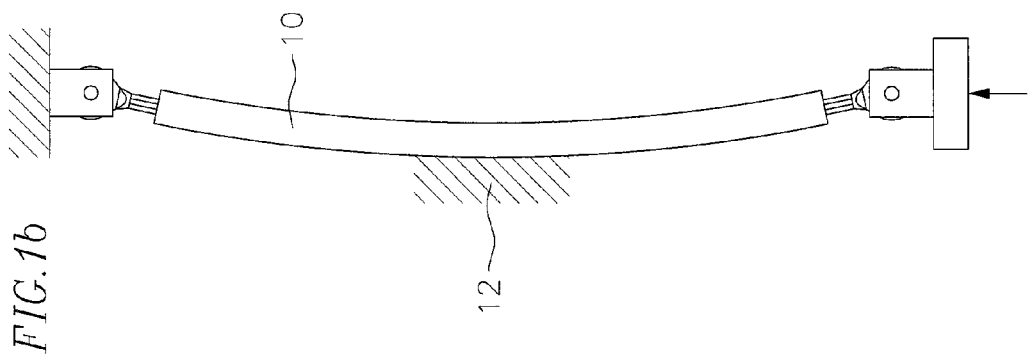
Figure 1A:
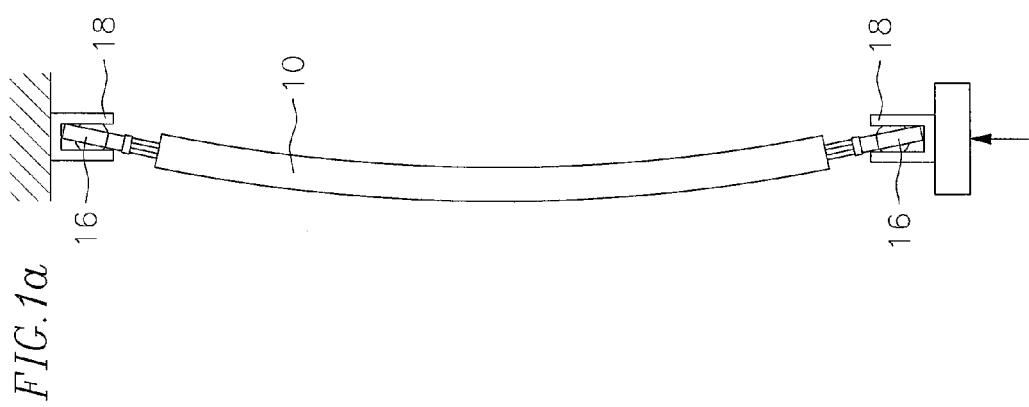

Applicants have developed fuse elongated structural member embodiments which greatly increase the repeatability and reliability of the compressive failure load and the resulting direction of structural member deformation during bending and subsequent failure.

Through the addition of purposeful eccentric loading, a moment is introduced throughout the member, which results in bending in a predetermined direction. By being able to control the direction of the bending and subsequent failure, the structural member allows for bending that is unobstructed along its full length, thus avoiding undesirable column fixity conditions. Sufficient load eccentricity also acts to ensure failure in high bending or Euler failure, which is more consistent. Applicants have discovered that by introducing sufficient load eccentricity above and beyond the manufacturing eccentricity, i.e., the eccentricity introduced during manufacturing due to manufacturing imperfections, they were able to control and predict compressive failure load (i.e., the fuse load) within 10% of the designed failure load, in some example embodiments, within 5% of the designed failure load, and in further example embodiments within 1% of designed failure load. A "load central longitudinal axis" as used herein refers to an axis of an elongated structure where when the structure is loaded under compression along this load central longitudinal axis the structure will crumple and fail at the compressive yield strength of the material from which it is made. In elongated structures such as cylinders having a central longitudinal axis which are manufactured without any eccentricity, the load central longitudinal axis is the same as the structures central longitudinal axis. Most structures have some manufacturing eccentricity built in (i.e., eccentricity caused by manufacturing imperfections) and as a result a compressive load applied along its central longitudinal axis leads to buckling of the structure at a compressive load lower than the compressive yield strength of the material that the structure is made of.

Fuse loads which are higher in tension than in compression can also be accommodated by incorporation of a shear pin for the tensile fuse load and eccentric bending for the compressive fuse load. The embodiments of this disclosure, offer a less expensive and more efficient means to achieve fuse loads in compression while still allowing for tensile fuse loads at a greater force if required.

Load eccentricity can be introduced in several ways. In example embodiments, load eccentricity is introduced by offset of connecting threads between end fitting and structural member, offset of internal threads of a structural member insert, offset of pin connections in end fitting threaded to or otherwise attached to structural member, or offset of pin connections in structural member; or pre-curved or pre-bent structural member. The eccentricity of the example embodiments structures is such that the compressive loading axis, i.e., the axis along which the load is applied is offset from the structure's central longitudinal axis when the structure has no eccentricity and is offset from the load central axis when structure has manufacturing eccentricity.

Structural members where $$\frac{L_e}{r_{min}} > \sqrt{\frac{\pi^2 E}{\sigma_y}}$$

are considered long and slender by Euler definition, where,
L=Length
$L_e$=Effective Length (varies by end fixity condition)
 An infinite number of effective lengths exist for any given Length due to variations in fixity and loading conditions.
 Examples of some common effective lengths with concentrated axial loading:

Pinned-Pinned; $L_e = L$

Fixed-Free; $L_e = 2L$

Fixed-Fixed; $L_e = \frac{1}{2}L$

Fixed-Pinned; $L_e = \frac{7}{10}L$ (Common effective lengths and methods of calculating less common effective lengths for various loading and boundary conditions of structures is provided in Jones, Robert M. *Buckling of Bars, Plates, and Shells*. Blacks-burg, Va.; Bull Ridge Publishing, 2006, the contents of which are fully incorporated herein by reference.)
$I_{min}$=Minimum Second Moment of Inertia
A=Cross sectional Area
$r_{min}$=Minimum Radius of $$\left(\frac{L_e}{r_{min}}\right)$$

$\sigma_y$=Yield Stress
E=Modulus of Elasticity
 A factor common to example embodiments detailed in this disclosure is the slenderness ratio $$\text{Gyration} = \sqrt{\frac{I_{min}}{A}}$$

of the structural member. This dictates the member's propensity to bend while under compression. Members with slenderness ratios high enough to be considered long and slender under Euler definition require lower load eccentricities to ensure predictable bending. Designs become less effective as slenderness ratios decrease and required eccentricities to ensure bending increase.

"Eccentricity", "load eccentricity" or "loading eccentricity" as used herein is the maximum distance between the structure's central longitudinal axis and the compression load axis as measured perpendicularly from the central longitudinal axis along the body of the structural member.

In one example embodiment, a first fuse member (i.e., structural member) 21 has long slender tube 10 by Euler definition having eccentric bore 20 for accepting a fitting 23 into said eccentric bore on one or both ends 22, as for example shown in FIGS. 2a and 2b. The eccentric end bore 20 has a central longitudinal axis 39 offset from a central longitudinal axis 35 of the structural member 21. The loading to the fuse member is applied through the fittings. In an example embodiment, each eccentric bore 20 has internal threads 24 onto which is threaded a corresponding fitting. Eccentric threading of tube is formed, machined or tapped off-center from the axis of the tube 10. In an example embodiment, one fitting is threaded in a clockwise direction, while the other fitting is threaded in a counter-clockwise direction. In this regard, rotating the tube in one direction while holding the fittings, will cause the fittings to thread into their corresponding bores, while rotating the tube in the opposite direction, while holding the fittings will cause the fittings to unthread from their corresponding bores. Once threaded sufficiently, each fitting may be locked in place with a corresponding lock nut which is threaded onto the threads of the fitting and fastened against the corresponding end of the tube. In an example embodiment each fitting has an opening 27 through which a load will be applied and a shaft 29 which is received in the end bore of the tube. In example embodiments, the load is applied by a pin inserted in the opening 27. Structural members which are loaded via pins or other members inserted into the fitting openings 27 are sometimes referred to as "pin-to-pin connected structural members". The opening 27 has a center 31 in line with the longitudinal central axis 33 of the shaft 29. The central longitudinal axis 33 of the shaft is co-axial with the central longitudinal axis 39 of the end bore. The distance 37 between the central longitudinal axis 35 and the central longitudinal axis 33 of the end bore as measured perpendicularly from the central longitudinal axis 37 is the loading eccentricity.

For offset of threads in an example embodiment, enough material should be present at the connection interface of the end fitting and the tube body to allow for both the full formation of threads and sufficient material wall thickness to cope with the additional stresses and moments imparted by the eccentric loading.

In another example embodiment, a long slender tube 32, by Euler definition, has thin wall geometry and concentric end bores 32 (FIG. 3a) for receiving inserts 34 (FIGS. 3b and 3c). In an example embodiment, the end bores 32 are threaded, i.e., they have an internal threaded surface 36 for receiving a threaded portion 38 of a corresponding insert 34. In example embodiment, at least one insert 34 is received into one end bore. The inserts 34 have an eccentrically formed hole 40. In an example embodiment, the eccentrically formed hole is formed on the insert off-center. In an example embodiment, the off-center hole 40 in each insert is formed by machining. In an example embodiment, the eccentrically formed hole has internal threads 42 for receiving threads of a fitting. In an example embodiment, where an insert is mated, e.g., threaded on each of the end bores 30, the eccentrically formed holes 40 on each insert are aligned, i.e., the have the same central axis. To assist with the alignment, in an example embodiment, a keyway slot 44 is formed on each insert end face 46. In an example embodiment, the eccentrically formed hole 40 has a central axis 50 offset from the central axis 52 of the insert by a distance 54, such that a diameter 56 of the eccentrically formed hole is offset in parallel from a diameter 58 of the insert by the same distance. In such example embodiment, each keyway slot is aligned along the diameter 56 of the eccentrically formed hole 40. In this regard once the inserts 34 are fitted into their corresponding end bores, the keyway slot of one insert is aligned to be parallel and on the same side of the long slender tube load central axis with the keyway slot of the other insert, and the inserts are oriented locked in place as for example by using wrenching flats formed on an outer surface of the insert or a nut also threaded on the outer surface of the insert. An adhesive may be used to adhere the insert to the long slender tube. In an example embodiment, once both inserts are oriented with their keyway slots parallel, the eccentrically formed holes of both inserts are coaxially aligned and then held through swaging of the tube body material against the threads of the insert, thus locking the insert's position and orientation with the tube body. To further help with the alignment, in an example embodiment, one fitting is threaded in a clockwise direction, while the other fitting is threaded in a counter-clockwise direction into their corresponding inserts. In this regard, rotating the tube in one direction while holding the fittings, will cause the fittings to thread into their corresponding bores, while rotating the tube in the opposite direction, while holding the fittings will cause the fittings to unthread from their corresponding bores. Orientation of the end fitting is achieved through the use of a locking device which locks the keyway of the insert at the same orientation of the keyway on the end fitting. Upon proper orientation of the end fittings to the insert and thus the tube, a lock nut is tightened into place which locks the position of the end fittings to the tube and each other. In an example embodiment each fitting has an opening 27 through which a load will be applied and a shaft 29 which is received in the end bore of the tube. The opening 27 has a center 31 in line with a longitudinal central axis 33 of the shaft 29. With these example embodiments, the distance 54 is the loading eccentricity.

In a further example embodiment, an outer diameter of the tube is reduced at mid-span 60 so as to lower the strength of the tube at mid-span and thus adjusting the failure point of the desired fuse load (FIG. 3d).

Figure 4:
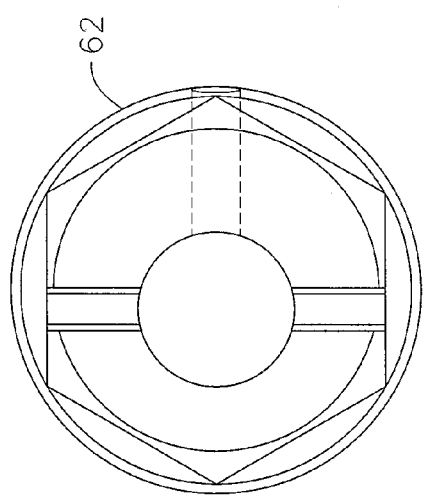
FIG. 4 is an end view of another example embodiment insert.

For structural members with insufficient material at the tube ends, inserts 62 may be used to strengthen the area while providing more area for eccentrically located threads (FIG. 4).

Figure 5:
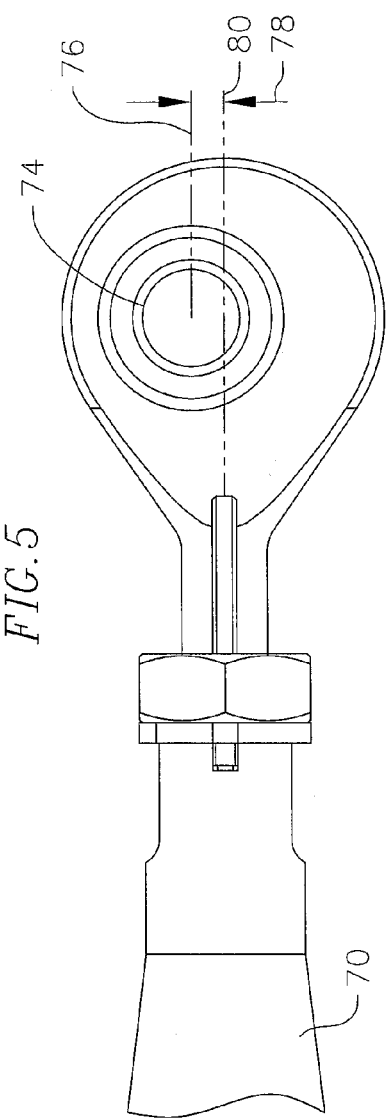
FIG. 5 is a partial side view of an example embodiment structural member including an example embodiment fitting.
Figure 6:
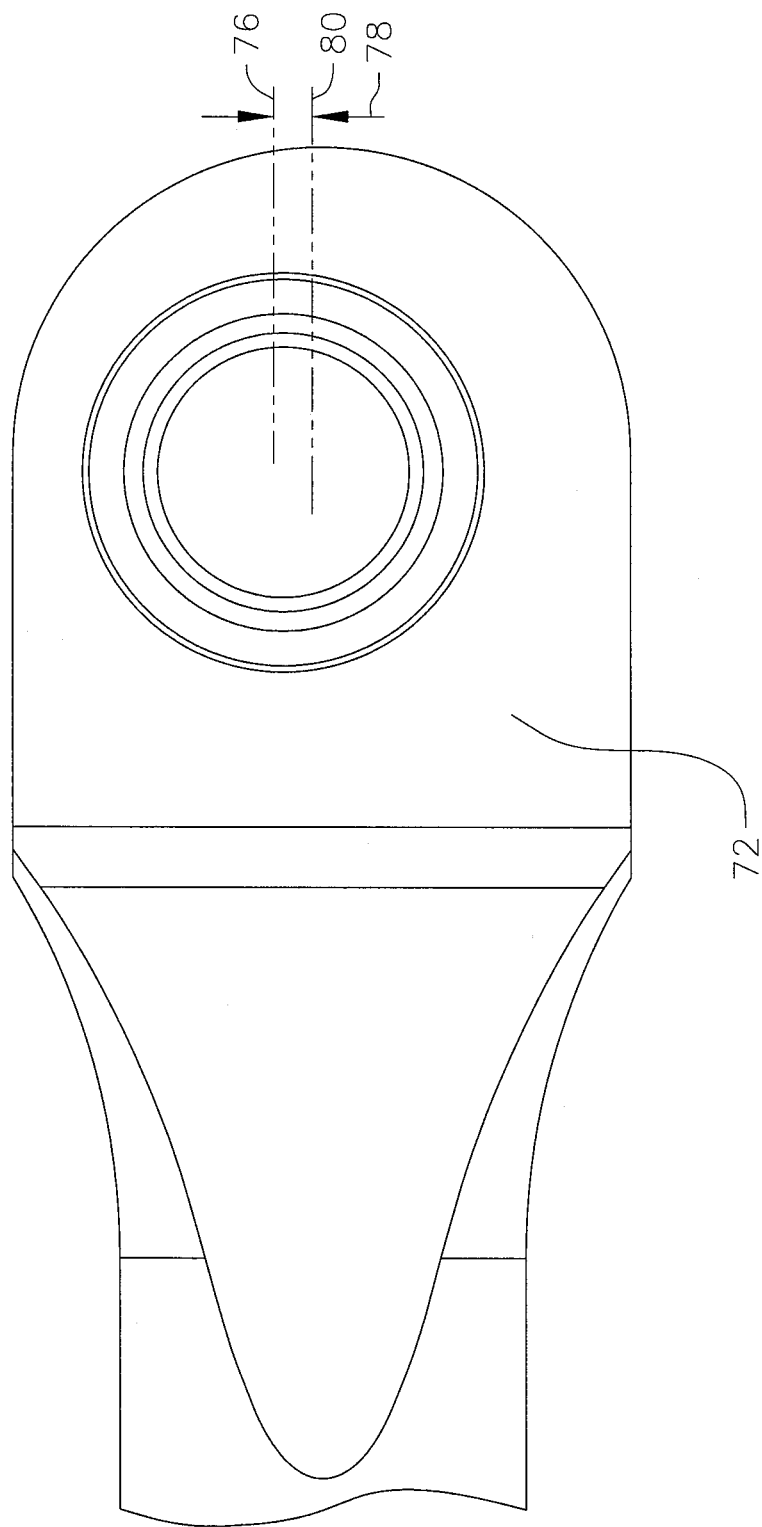
FIG. 6 is a partial side view of another example embodiment structural member with an integral fitting.

In a further example embodiment, a structural member, such as a tube or strut 70 is used with concentric end bores for receiving fittings, each fitting 72 having an off-centered opening 74, as for example shown in FIG. 5. The opening 74 receives the load applying member as for example a bearing cartridge, or a pin, or a bushing or a spherical ball. In an example embodiment, the axes 76 of the end fitting openings 74 through a diameter or a center of the openings and are offset by a distance 78 from the central axis 80 of the structural member 70. In an example embodiment, the axes of the openings 74 are aligned with each other. In other example embodiments the fitting(s) 72 is integrally formed with the structural member 70, as for example shown in FIG. 6. The distance 75 is the loading eccentricity.

Figure 7:
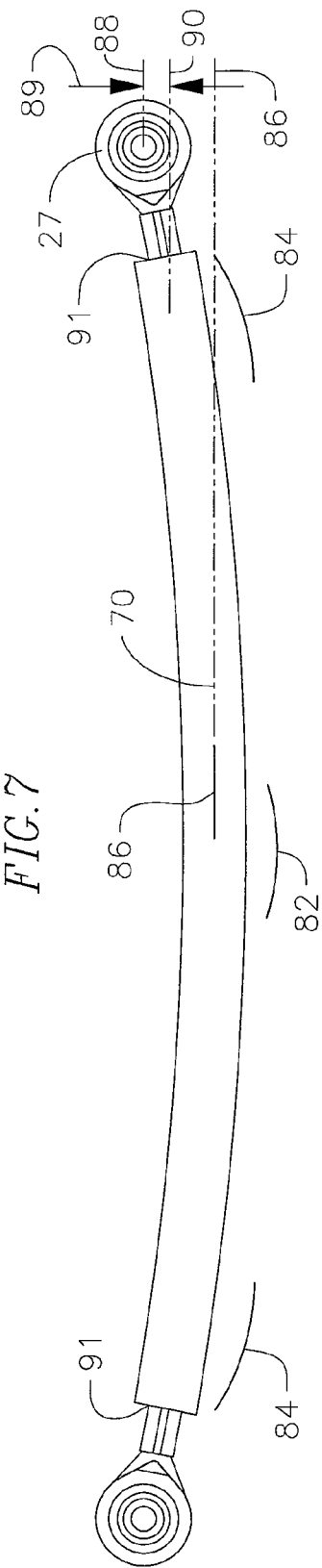
FIG. 7 is a side view of another example embodiment structural member including fittings.

In another example embodiment as shown in FIG. 7, a structural member 70, such as a tube or strut is formed in into a bent shape or is pre-bent into a bent arcuate shape where a mid-span section 82 of the tube is offset from the end sections or extremities 84. In other words, a plane 86 through said mid-section center which is parallel to a plane 88 through the centers of the fitting openings 27, is spaced a greater distance from the plane 88 than a plane 90 through the centers of the ends 91 of the structural member. The plane 86 is sufficiently offset from the plane 88 by a distance 84 to induce desired bending and a predictable failure load when under compressive loading via the fittings. The distance 76 defines the loading eccentricity. In an example embodiment, the structural member is plastically deformed at or proximate its mid-span.

Figure 8:
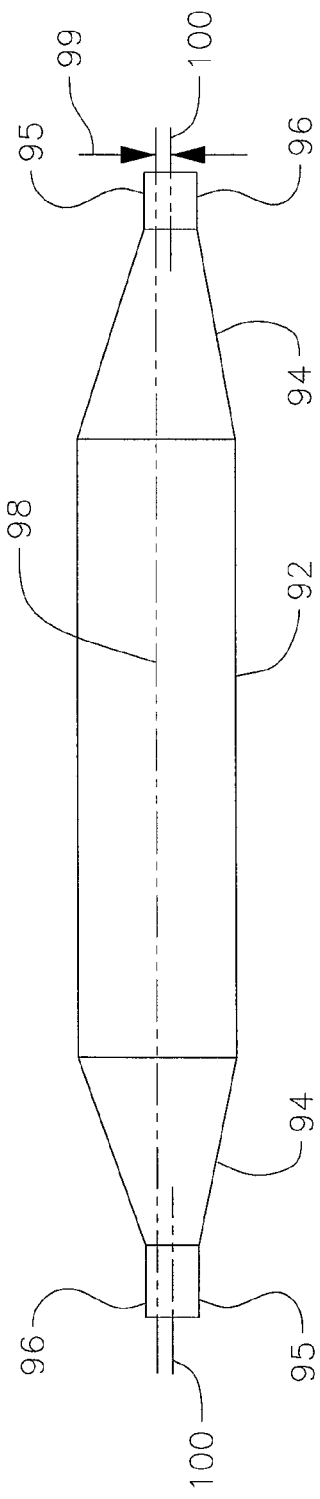
FIG. 8 is a side view of another example embodiment structural member without fittings.

In yet another example embodiment, a structural member, such as a tube or strut has a straight mid-section 92 as for example shown in FIG. 8 and has swaged end sections 94 ending in end sections 95, each defining an end bore 96 for receiving a fitting. In an example embodiment, the mid-section is a cylindrical member having a central longitudinal axis 98, and each end section is also cylindrical having a central longitudinal axis 100. In the example embodiment both end sections have the same central longitudinal axis 100 which is offset in parallel by a distance 99 from the mid-section central longitudinal axis 98. The distance 99 is the loading eccentricity.

In yet a further example embodiment, a structural member, such as a tube or strut 110 is formed, as for example by machining, or by other methods, to have a second lower moment of inertia about a cross-sectional axis in line with the desired axis of bending 112 (FIGS. 9a and 10a) and a higher second moment of inertia about the cross-sectional axis 114 which is perpendicular to the desired axis of bending 112 (FIGS. 9b and 10b). This, in one example embodiment as shown in FIGS. 9a, 9b, 10 a, and 10b, is accomplished by making the structural member thinner at its mid-section 116 when viewed along the desired bending axis 112 as shown in FIGS. 9b and 10b and thicker when viewed along cross-sectional axis 114 as shown in FIGS. 10a and 10b. In the embodiments shown in FIGS. 9b and 10b, the mid-section 116 is thinner than the end sections 118. In the embodiments shown in FIGS. 9a, 9b, 10a and 10b, the central longitudinal axis 120 is co-linear with the central longitudinal axis 122 of the end sections.

In other example embodiments as shown in FIGS. 11a, 11b, 12a and 12b, eccentric loading is allowed by machining or forming the structural member (e.g., the tube or strut) 110, by removing material or by recessing the member at one side of the mid-section 116 defining a recessed surface 130. Thus, a load central longitudinal axis 133 of the recessed structure is offset by a distance 135 from load axis 132. In this regard a longitudinal axis 132 along which a load will be applied is closer to the recessed surface than to surface 134 opposite the recessed surface as measured along a direction 136 through and perpendicular the longitudinal axis 132. The distance 135 is the loading eccentricity. In this regard, structural member will bend toward the recessed section when under compression.

In the example embodiments, including the recessed mid-section, the non-recessed portion of the mid-section in example embodiments is circular in cross-section. In other embodiments such non-recessed section may have other cross-sectional shapes as for example polygonal, elliptical, etc. The example embodiments of FIGS. 2a to 8 and FIGS. 11a to 12b loading eccentricity is provided that exceeds any manufacturing eccentricity present and/or is such as to cause bending in a direction other than the direction the structure would have failed under compressive loading due to its manufacturing eccentricity.

Pin-to-pin connected structural members are designed and manufactured with the least amount of load eccentricity possible. Structural members that incorporate the eccentric loading as in the example embodiments of the present disclosure allow for predictable failure loads and directions of failure. This enables the design of structural members that are able to fail at highly consistent loads.

In the example embodiments provided herein, the load is applied along a load axis that is offset from a central longitudinal axis of the elongated slender member. This load axis may be parallel to the central longitudinal axis of the member. In some embodiments, this load axis is not parallel to the central longitudinal axis but is offset at each end of the structural member by the same distance from the central longitudinal axis. In other example embodiments, the elongated slender member may not be cylindrical and may have other shapes, as for example, it may be an I-beam in cross-section, which is symmetric about a symmetry plane through its central longitudinal axis. In the embodiments where a section of the central longitudinal member is removed or recessed, as for example shown in FIGS. 9a to 11b, the structural member may not be symmetrical about such a symmetry plane.

In example embodiments, by ensuring the direction of the failure and that the end connections will remain free to rotate, moments are not transmitted through the structural member, e,g, the tube or strut, to the next connecting element.

Example structural members having on load eccentricity induced bending are able to have higher fuse loads in tension than in compression. In compression the fuse load is driven by the bending failure and in tension by the weakest cross section along the member.

Testing has been conducted on the induced eccentricity concept by offsetting threads in the example embodiment, as shown in FIG. 2a. Tests were performed using 0.015 in. and 0.030 in. thread offset on 0.500 inch outside diameter (OD)× 0.156 inch thick wall stock tube. FIGS. 13 and 14 show the results of this testing. For the 0.015 inch eccentrically loaded thread specimen, significant scatter in the failure loads can be seen. Manufacturing eccentricities in the aerospace industry vary by design and scale of the structural member. Typically, structural members designed for compressive loads have manufacturing eccentricity held to the tightest limits possible, usually well under 0.015 inch for lengths up to approximately 24 inch As assemblies increase in length, some manufacturing eccentricities may increase due to mid-span run out at a rate of approximately 0.0005 inch/inch of length. As can be seen from FIG. 10, for the higher load failures, load vs. axial deflection remained linear as load increased until localized compressive yielding was followed by an abrupt failure. Example embodiment elongated structures have an eccentricity rate equal to the manufacturing eccentricity rate (R) plus an additional eccentricity rate. In one example embodiment, the additional eccentricity rate is at 0.0001 inch/inch of length. In another example embodiment, it is 0.0002 inch/inch of length. In a further example embodiment, it is 0.0003 inch/inch of length. In a yet another example embodiment, it is at least 0.0004 inch/inch of length. In yet a further example embodiment, it is at least 0.0005 inch/inch of length.

In the testing samples that failed at lower loads, an abrupt change from linear axial deformation to bending can be seen followed by a gradual increase in the rate of deflection, which is a result of an increasing bending rate. All tubes in these tests did bend in the predicted direction; however the consistent nature of an Euler failure, with large bending deflections, was not consistently present. The mixture of failure types as previously discussed was still present with the 0.015 in. eccentricity and lead to a large compressive failure load scatter between the testing samples.

Testing conducted on the 0.030 inch eccentrically located threads showed a consistent failure in bending that was both repeatable and reliable, as can be seen in FIG. 11. The significant bending can be seen in FIG. 11 as the point where load vs. displacement is no longer linear. Worthy of note with this set of testing specimens is the more gradual entry into bending and a highly repeatable and reliable failure load.

While the example embodiments have been described with elongated structures that are long and slender by Euler definition, Applicants have discovered that they can obtain similar or the same fuse load predictability with structural members of intermediate slenderness ratios where $$1 \geq \frac{\frac{L_e}{r_{min}}}{\sqrt{\frac{\pi^2 E}{\sigma_y}}} \geq \frac{1}{2}$$

Although such structural members may require greater induced eccentricity as compared to that required to overcome the manufacturing eccentricity alone. Thus, in an example embodiment, the slenderness ratio of the structural member is equal to or greater than $$\frac{1}{2} \left( i.e., \frac{\frac{L_e}{r_{min}}}{\sqrt{\frac{\pi^2 E}{\sigma_y}}} \geq \frac{1}{2} \right).$$

Applicants have discovered that the minimum eccentricity required to induce bending in example embodiments in a predictable direction and at consistent failure loads can be defined by the following equation.

$$\text{Min. Req. Eccentricity} = \left(.02 \frac{\sqrt{\frac{\pi^2 E}{\sigma_y}}}{\left(\frac{L_e}{r_{min}}\right)}\right) + R;$$

$$\text{When } \left(\frac{1}{2} \leq \frac{\frac{L_e}{r_{min}}}{\sqrt{\frac{\pi^2 E}{\sigma_y}}} \text{ and } (3 \text{ in} \leq L \geq 72 \text{ in})\right)$$

where R is the manufacturing eccentricity rate. In an example embodiment, R is 0.0005 or less. For intermediate structural members where $$\frac{1}{2} \leq \frac{\frac{L_e}{r_{min}}}{\sqrt{\frac{\pi^2 E}{\sigma_y}}} \leq 1,$$

$$\text{Min. Req. Eccentricity} = \left(.02 \frac{\sqrt{\frac{\pi^2 E}{\sigma_y}}}{\left(\frac{L_e}{r_{min}}\right)}\right);$$

$$\text{When } \left(\frac{1}{2} \leq \frac{\frac{L_e}{r_{min}}}{\sqrt{\frac{\pi^2 E}{\sigma_y}}} \leq 1 \text{ and } (3 \text{ in} \leq L \geq 72 \text{ in})\right)$$

In any of the aforementioned embodiments, the compression load axis (i.e., the axis along which the compressive load is applied) is parallel with the load central longitudinal axis.

Figure 15:
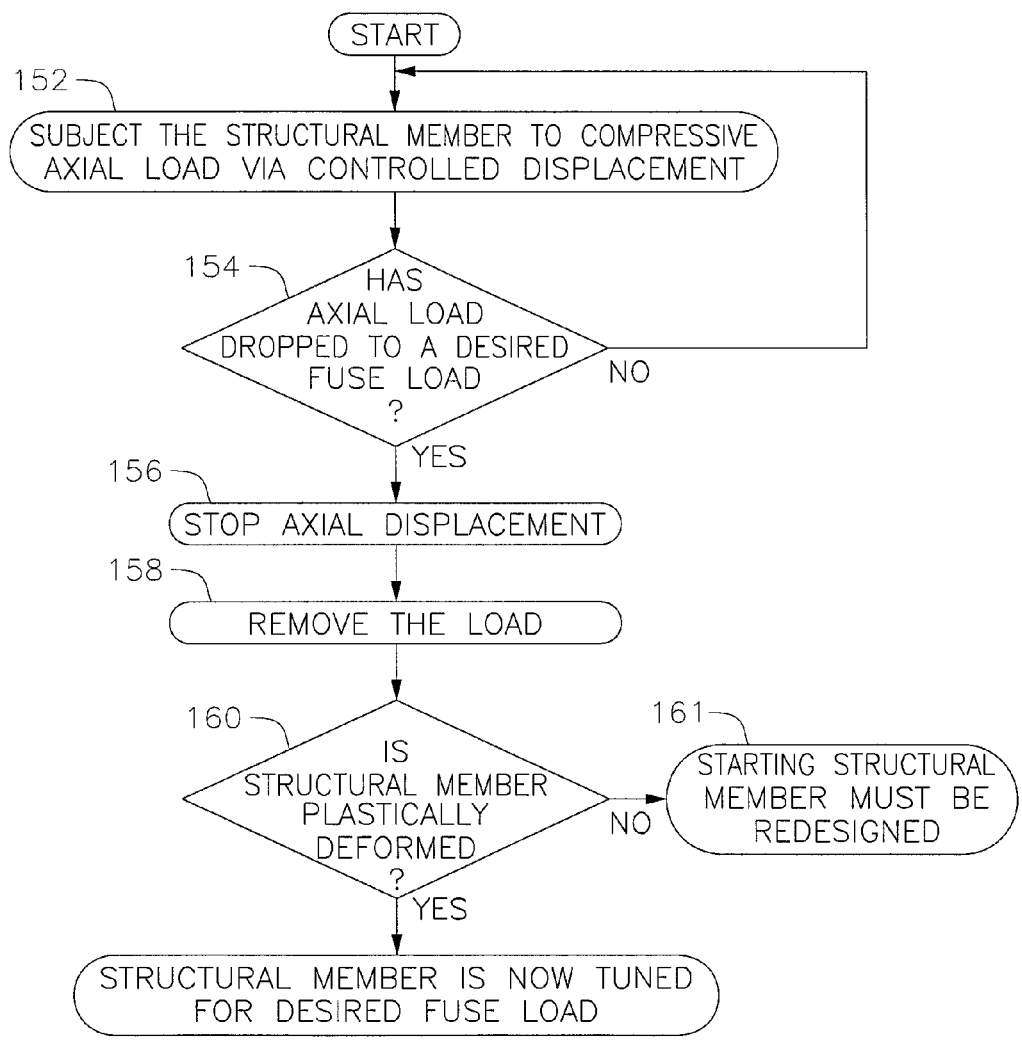
FIG. 15 is a flow chart of an example embodiment approach for tuning a fuse load of an example embodiment structural member with eccentricity.

Applicants have also discovered that they can tune the example embodiment structural members to fail at a desired fuse load. To do so, Applicants first subject the structural member to a compressive axial load via controlled displacement (block 152, FIG. 15) while the ends of the structural member are constrained as they would be constrained during actual use. For example, in many aircraft embodiments, the structural members are pin to pin constrained. In other words, the ends of the structural member are rotatable about their corresponding pins to which they are coupled. By subjecting the structural member to a compressive axial load by displacement in the compressive direction, the load would reach an ultimate strength, and the load would then begin to drop upon further displacement. If the axial load drops to a level of a desired fuse load (block 154), then the axial displacement is stopped (block 156). If not, the axial displacement continues until the axial load is dropped to the level of a desired fuse load (block 154). Once the axial load is stopped, the axial load is removed (block 158), the structural member is evaluated to confirm that it is plastically deformed (block 160). Many methods well known in the art can be used to confirm plastic formation. One example method may be to inspect the bent structural member to see if it has stayed in the bent state. That would be an indication of plastic deformation. If plastically deformed, then the structural member is tuned to the desired fuse load and should fail at or slightly above such fuse load. If the structural member is not plastically deformed, then the structural member needs to be redesigned (e.g. the eccentricity or slenderness of the structural member may need to be modified) (block 161).

Figure 16:
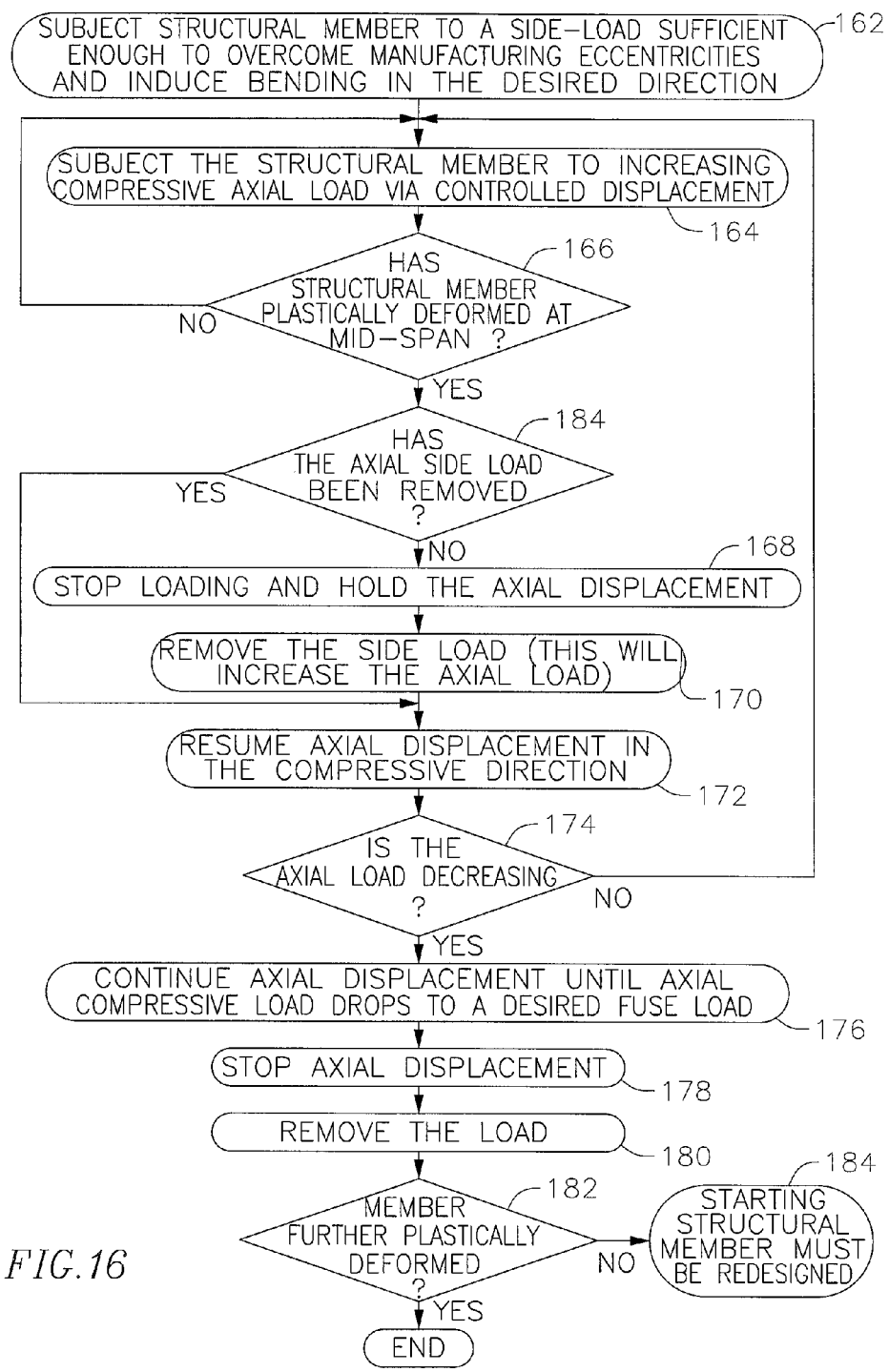
FIG. 16 is a flow chart of an example embodiment approach for tuning a fuse load of a structural member without eccentricity or with just manufacturing eccentricity.

Applicants have also discovered that they can tune the fuse load even for structural members which are not eccentrically loaded or which only have a manufacturing eccentricity built into them. In such case, the structural member is subjected to a side load sufficient to overcome the manufacturing eccentricities and induce bending to a desired direction (block 162, FIG. 16) while constrained as they would during actual use. The structural member is then subjected to an increase in compressive axial load by controlled compressive displacement (block 164). During such displacement, the load would reach an ultimate strength and the load would then begin to drop upon further displacement. The displacement is continued until the structural member is plastically deformed at its mid-span (block 166). As discussed previously, plastic deformation can be easily determined using well known methods. If the structural member is plastically deformed, then the loading is stopped and the axial displacement is held (block 168). The side load is then removed (block 170) and the axial displacement is then resumed in the compressive direction (block 172). If the load continues to decrease (block 174), then the axial displacement is continually applied until the axial compressive load drops to a level that is equal to the desired fuse load (block 176). When at that level, the axial displacement is stopped (block 178) and the axial load is removed (block 180). If the member has further plastically deformed (block 182) over the plastic deformation as per block 166, then the member is tuned to the desired fuse load. If not, then the structural member needs to be redesigned (e.g. the eccentricity or slenderness of the structural member may need to be modified). If the applied load is not decreasing (block 174) then the structural member is continuously subjected to an increase in compressive loading by controlled displacement (block 164) until the member is plastically deformed at the mid-span (block 166). If the side load has already been removed (block 184), then the axial displacement is continued until the axial compressive load drops to a level equal to the desired fuse load level (block 176). In such case, the axial displacement is stopped (block 178) and the load is removed (block 180) and the further plastic deformation is confirmed (block 182). If the plastic deformation is confirmed, the structural member is now tuned to the desired fuse load. If not, then the structural member needs to be redesigned (block 184).

Applicants have discovered that they can design elongated structural members to bend in, or generally in, a predetermined direction and to fail at a, or generally at a, predetermined load by incorporating sufficient eccentricity to such members. This is especially important when such structural members are used in aircraft where unpredicted failure as well as unpredicted bending direction can cause damage to and or jam surrounding structures and parts. Thus, in example embodiments, a method is provided for designing or forming elongated structural member that fail at a, or generally at a, predetermined load and in, or generally in, a predetermined direction by offsetting the compression load axis relative to the structural member and load central longitudinal axis, as described herein. In example embodiments, such offset is in parallel.

While the present disclosure has been described with respect to a limited number of embodiments, those skilled in the art, having benefit of this disclosure, will appreciate that other embodiments and modifications can be devised which do not materially depart from the scope of the invention as disclosed herein. All such embodiments and modifications are intended to be included within the scope of this disclosure as defined in the following claims.

The invention claimed is:

1. A method of tuning a structural member comprising an eccentricity to a fuse load, the method comprising:
   subjecting the structural member to a compressive axial load by compressive axial displacement; and
   stopping the compressive axial displacement when the compressive axial load drops to a level of the fuse load, wherein said structural member is tuned to said fuse load when said compressive axial load has plastically deformed said structural member.

2. A method of tuning a structural member to a fuse load, the method comprising:
   subjecting the structural member to a side load sufficient to bend said structural member in a desired direction;
   subjecting the structural member to a compressive axial load by compressive axial displacement;
   stopping the compressive axial load and holding the axial displacement, when the structural member has plastically deformed at mid-span or proximate mid-span;
   removing the side load;
   continuing subjecting the structural member to a compressive axial load by compressive axial displacement; and
   stopping the compressive axial displacement when the compressive axial load drops to a level of the desired fuse load, wherein said structural member is tuned to said fuse load when said compressive axial load has further plastically deformed said structural member.

3. The method of claim 2, wherein continuing subjecting the structural member to a compressive axial load comprises continuing subjecting the structural member to an increasing compressive axial load.

* * * * *